March 18, 1930.　　　H. CROSS ET AL　　　1,751,264
CHEESE CUTTER
Filed March 1, 1928
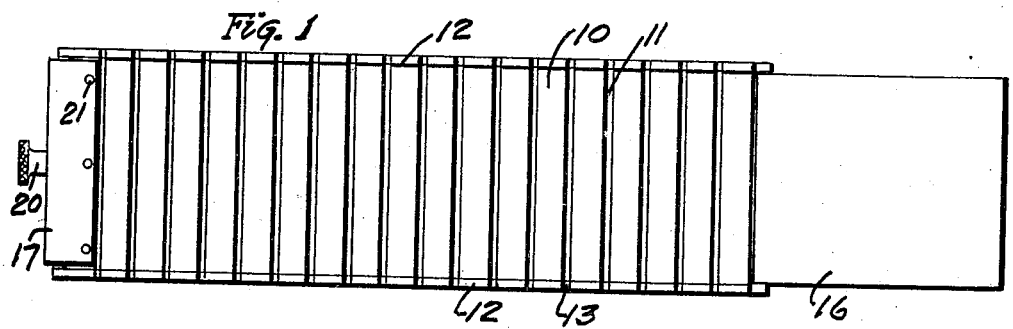
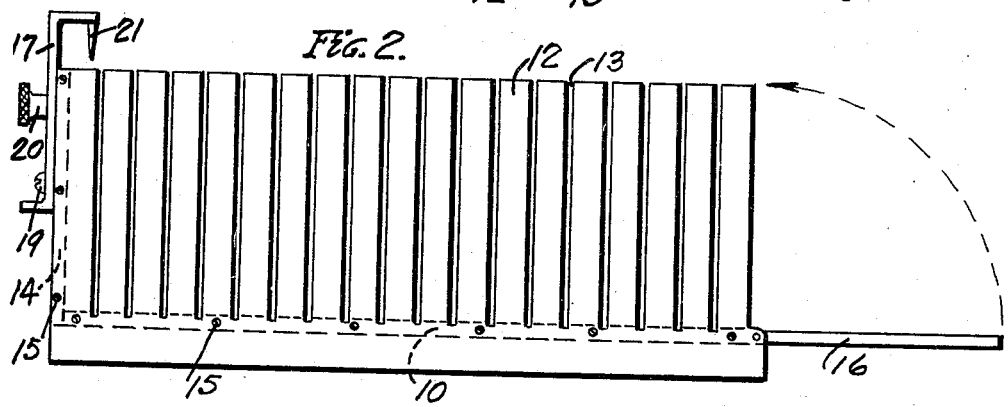
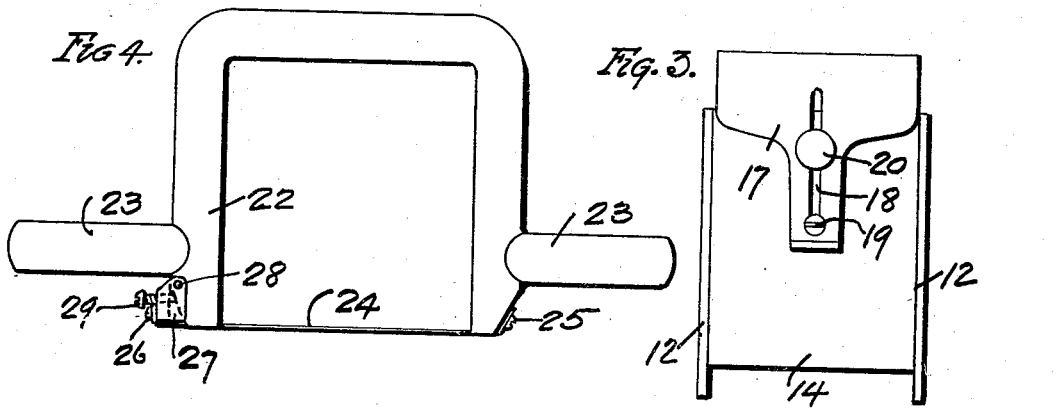
INVENTORS
Herman Cross
Thomas J. Slagle
by J. H. Weatherford
ATTORNEY.

Patented Mar. 18, 1930

1,751,264

UNITED STATES PATENT OFFICE

HERMAN CROSS AND THOMAS J. SLAGLE, OF BLYTHEVILLE, ARKANSAS

CHEESE CUTTER

Application filed March 1, 1928. Serial No. 258,156.

This invention relates to improvements in apparatus for cutting blocks of cheese into uniform size sections and is specifically designed for use in cutting the rectangular blocks into which a great many kinds of cheese are now molded.

The objects of our invention are:

To provide a device of the character described which will securely hold the cheese to be cut against displacement in the cutting box, and which will definitely and positively guide the cutter against displacement in either direction.

The means by which the foregoing and other objects are accomplished, will readily be understood from the following specification on reference to the accompanying drawings in which:

Fig. 1 is a plan of the cutter box;
Fig. 2 is a side elevation of the box;
Fig. 3 is an end elevation; and
Fig. 4 is a side elevation of a cutter usable with the box.

Referring now to the drawings in which the various parts are indicated by numerals, 10 is the base plate of the box, having a plurality of equally spaced grooves 11, formed therein, these grooves extending laterally across the base at right angles thereto. 12 are the side walls which walls have equally spaced vertical grooves extending from the top thereof down to the level of the grooves in the base plate. The slots in these walls are spaced to conform exactly with the grooves in the base being therefore necessarily evenly spaced. 14 is a fixed end wall, the sides being secured to this end wall and the base preferably by screws 15. Preferably the side walls extend slightly below the base, whereby a support is formed and at the same time sufficient unslotted metal is left to hold together the slotted portion of the walls. 16 is a hinged end wall, which hinged end wall may be swung upward in the direction of the arrow to engage and force a block of cheese solidly against the fixed end wall. 17 is a securing member which member is provided with a vertical slot 18 and is secured to an end wall 14 by a guiding pin or screw 19 and clamping screw 20, both disposed through the slot 18. This securing member is provided with a plurality of vertically depending prongs or teeth 21, which teeth are adapted to engage and hold a block of cheese while it is being cut. When the cheese is in place and firmly placed against the fixed end wall 14, this securing member may be forced down, the clamping screw 20 first being loosened, and the teeth 21 forced into the cheese, after which the screw 20 may be tightened to securely hold the securing member.

The cutter comprises a rigid U shaped frame 22, having oppositely disposed handles 23 and a cutting wire 24 stretched across the open portion of the U. One end of this wire is secured to one leg of the frame by a screw 25 and the opposite end of the wire is secured by a screw 26 to a member 27 hinged by a pin 28 to the opposite frame leg. 29 is a set screw which may be tightened to stretch the wire 24.

In using the device, a rectangular block of cheese is placed in the casing and is forced back against the fixed end wall by closing the hinged door 16. If the cheese be too short a suitable block may be placed between the end of the cheese and the door to accomplish this clamping. With the cheese forced against the end 14, the screw 20 is loosened and the teeth 21 forced into the block of cheese and the screw 20 tightened. Preferably the foil with which the cheese is wrapped is not removed when the cheese is placed in the cutter box. With the cheese in place the wire of the cutter is disposed in the slot farthest away from the fixed end of the box and the cutter forced down to separate off a slice from the block of cheese and this operation is repeated until such number of slices have been cut as may be desired.

It will especially be noted that, owing to the toughness of the cheese and the wrapping on the same, it is absolutely essential that the cutter be guided against displacement in either direction, it being practically impossible to cause the cutter to follow a straight line against a single guiding member.

Having described our invention, what we claim is:

In a cheese cutter, the combination with a rectangular casing, comprising a base plate, side walls having equally spaced slots extending from the top thereof to said base, through which slots cutting means may be operated, a rigid end wall, and a hinged end wall, of a member carrying a plurality of vertically depending teeth, said member being mounted on said rigid end plate and vertically slidable thereon, and means for clamping said member to said end plate, whereby said teeth may be forced into and rigidly secure a block of cheese to be cut.

In testimony whereof we have hereunto set our names.

HERMAN CROSS.
THOMAS J. SLAGLE.